United States Patent
Turi

(10) Patent No.: US 12,547,026 B2
(45) Date of Patent: Feb. 10, 2026

(54) ELECTRO-OPTICAL DISPLAY

(71) Applicant: Continental Automotive Technologies GmbH, Hannover (DE)

(72) Inventor: Adrian Turi, Timisoara (RO)

(73) Assignee: Continental Automotive Technologies GmbH, Hannover (DE)

( * ) Notice: Subject to any disclaimer, the term of this patent is extended or adjusted under 35 U.S.C. 154(b) by 0 days.

(21) Appl. No.: 18/718,568

(22) PCT Filed: Dec. 1, 2022

(86) PCT No.: PCT/EP2022/084035
§ 371 (c)(1),
(2) Date: Jun. 11, 2024

(87) PCT Pub. No.: WO2023/110429
PCT Pub. Date: Jun. 22, 2023

(65) Prior Publication Data
US 2025/0044632 A1     Feb. 6, 2025

(30) Foreign Application Priority Data

Dec. 13, 2021   (EP) .................................... 21465571
Dec. 14, 2021   (GB) .................................... 2118050

(51) Int. Cl.
*G02F 1/1333*     (2006.01)
*G02F 1/133*      (2006.01)
*G02F 1/1335*     (2006.01)

(52) U.S. Cl.
CPC .... *G02F 1/133382* (2013.01); *G02F 1/13306* (2013.01); *G02F 1/133314* (2021.01); *G02F 1/133331* (2021.01); *G02F 1/133628* (2021.01)

(58) Field of Classification Search
CPC .......... G02F 1/133382; G02F 1/13306; G02F 1/133314; G02F 1/133331; G02F 1/133628
See application file for complete search history.

(56) References Cited

U.S. PATENT DOCUMENTS

2007/0002256 A1* 1/2007 Kim .................... G02F 1/13454
                                                            349/150
2013/0106922 A1* 5/2013 Chen ................... G02F 1/13306
                                                            359/240

(Continued)

FOREIGN PATENT DOCUMENTS

CN      112180632 A    1/2021
CN      214041935 U    8/2021

(Continued)

OTHER PUBLICATIONS

Search and Examination Report dated Apr. 20, 2022 from corresponding GB patent application No. 2118050.0.

(Continued)

*Primary Examiner* — Donald L Raleigh
(74) *Attorney, Agent, or Firm* — COZEN O'CONNOR

(57) ABSTRACT

The present disclosure is related to an electro-optical display having a front glass, a display panel, a back light unit, a backplate, a display driver arranged on the display panel, and a graphite sheet extending from the display driver to the backplate. The graphite sheet is connected directly to a surface of the display driver and to the outer side of the backplate.

5 Claims, 2 Drawing Sheets

(56) References Cited

U.S. PATENT DOCUMENTS

| | | | |
|---|---|---|---|
| 2015/0362791 A1 | 12/2015 | Kakuda et al. | |
| 2016/0183415 A1* | 6/2016 | Kim | H05K 1/0209 345/205 |
| 2017/0148702 A1 | 5/2017 | Funayama et al. | |
| 2019/0049794 A1* | 2/2019 | Liu | G02B 6/0085 |
| 2019/0302351 A1 | 10/2019 | Hayashi et al. | |
| 2021/0200020 A1* | 7/2021 | Kim | G03B 30/00 |
| 2022/0317363 A1* | 10/2022 | Zhou | G02F 1/133628 |

FOREIGN PATENT DOCUMENTS

| | | |
|---|---|---|
| DE | 102019205029 A1 | 10/2020 |
| EP | 3112977 A1 | 1/2017 |
| JP | H10214045 A | 8/1998 |
| JP | 2010085547 | 4/2010 |
| KR | 101596348 B1 | 3/2016 |

OTHER PUBLICATIONS

International Search Report and Written Opinion dated Mar. 6, 2023 from corresponding International patent application No. PCT/EP2022/084035.

Examination Report dated Apr. 15, 2024 from corresponding GB patent application No. 2118050.0.

Office Action of corresponding European Patent Application No. EP 22823543.8, dated Jul. 15, 2025.

Office Action of corresponding Korean Patent Application No. KR 10-2024-7016760, dated Jun. 26, 2025.

\* cited by examiner

ELECTRO-OPTICAL DISPLAY

CROSS REFERENCE TO RELATED APPLICATIONS

This US patent application claims the benefit of PCT patent application No. PCT/EP2022/084035, filed Dec. 1, 2022, which claims the benefit of GB application 2118050.0, filed Dec. 14, 2021 and EP application 21465571.4, filed Dec. 13, 2021, all of which are hereby incorporated by reference.

TECHNICAL FIELD

The present disclosure is related to an electro-optical display and to an automotive vehicle provided with such electro-optical display. It is especially directed to heat dissipation of a display driver of such electro-optical display using graphite foil.

BACKGROUND

Nowadays many electro-optical displays are based on liquid crystal display (LCD) technology. The following description will focus on LCD displays but the same technique is applicable to any similar display technology like OLED (organic light emitting diode) display technology, LED (light emitting diode) technology or the like. Using an LCD display, the LCD screen heats up during operation, but most of the time the temperature must be well controlled especially when it is operating inside an automotive vehicle, such as a car. Automotive displays, e.g. displays used in cars, must meet strict temperature requirements and many more requirements. Several factors that lead to excessive heating of the display are mainly backlight LEDs, the ambient temperature, and the display driver IC. To overcome this problem, display manufacturers deploy several techniques in order to minimize the effect of display overheating. Even though, customer requirements are becoming more and more stringent on the display screen to withstand a rise in temperature. For backlight temperature there are many techniques to control the temperature, like backlight derating or using local dimming. For controlling the temperature of the display driver there are several solutions like using different configuration which are not using internal voltage sources, choosing the minimum operation voltages of the display panel, or using minimum pixel clock value.

One of the main issues when using displays in automotive applications is that, as the display driver temperature rises, a local hotspot appears in the area around the display driver. If this local hotspot rises above the maximum allowable temperature of the polarizer, the display image will degrade due to the permanent destruction of the polarizer. Also, other components like the liquid crystal material itself or other optical elements may degrade if overheated. In order to meet higher temperature requirements, and to avoid destruction of the polarizer due to excessive heating of the display driver it is necessary to lower the temperature in the area around the display driver.

US 2007/002 256 A1 shows a liquid crystal display device provided with a graphite pad that transports heat to a housing of the liquid crystal display device. This leads to heat spreading which in turn lowers the temperature at a hot spot. It is thus used for solving punctual overheating problems.

US 2019/302 351 A1 shows an electro-optical display having a front glass, a display panel, a back light unit, a backplate, a display driver arranged on the display panel, and a graphite sheet extending from the display driver to the backplate. The graphite sheet is connected to the display panel at an opposite side to the area where the display driver is arranged, and to the inner side of the backplate. This provides for heat transport away from the area at which the display driver is arranged but might still be improved.

SUMMARY

It is desired to further lower the temperature in the display driver area avoiding a permanent polarizer destruction and a degradation of the image without affecting the optical performance of the display.

This is achieved by an electro-optical display according to the claims and by an automotive vehicle according to the claims. The dependent claims include further developments and improvements of the present principles as described below.

An electro-optical display according to the disclosure has the graphite sheet connected directly to a surface of the display driver and to the outer side of the backplate. Heat is efficiently transported away from the display driver without or at least strongly reduced heat dissipation to the display panel. This avoids hotspots on the display panes which increases the lifetime of the display panel elements, as e.g., polarizers or a liquid crystal. The graphite sheet arranged according to the disclosure provides for electro-magnetic shielding. The graphite sheet according to the disclosure is arranged between electronic parts of the electro-optical display and outside disturbances. These electronic parts are e.g., the driver IC (integrated circuit), a flexible printed circuit sheet, a printed circuit board, electronic elements arranged on these, or electric lines/data lines arranged on the display panel.

In an embodiment, the display driver is arranged on a glass substrate of the display panel and the graphite sheet covers the whole area of the glass substrate on which area the display driver is arranged. This area is an area that extends further than other elements of the display panel. Preferably it is a substrate on which other elements of the display panel are arranged. Thus display driver and elements connected to the display driver like capacitors, resistors, connector lines, supporting ICs, etc. may be arranged thereon and may be electrically connected to each other. Independent on where especially much heat producing elements are arranged, a good heat transport away from these is made possible. Further, all these elements get electromagnetic shielding from the graphite foil. This is also the case for electrodes printed on the glass substrate or arranged on the glass substrate. If these electrodes are used to control display pixels of the display panel, it is especially advantageous to shield these in order to prevent malfunction.

In an embodiment, the display driver is arranged close to a polarizer of the display panel or close to a polarizer of the backlight unit. Despite heat produced by the display driver, a placement close to a polarizer—which is a heat sensitive element that will be permanently destroyed if overheated—is made possible due to the inventive arrangement of the graphite sheet that is directly in contact with the display driver.

In an embodiment, the front glass is optically bonded to the display panel. This allows to reduce the vertical extension of the electro-optical display. Such thin electro-optical display is made possible by the small vertical extension of the graphite foil compared to hitherto used metallic heat sinks which could not be arranged between display driver and cover glass and still transport sufficient heat away from the display driver.

An electro-optical display according to the disclosure is used as a display device for automotive vehicle applications. This is particularly advantageous for applications with strong requirements regarding temperature conditions under which the display must be able to operate, as they occur in motor vehicles.

BRIEF DESCRIPTION OF THE DRAWINGS

Further features of the present disclosure will become apparent from the following description and the appended claims in conjunction with the figures, wherein:

DETAILED DESCRIPTION

Figure 1:
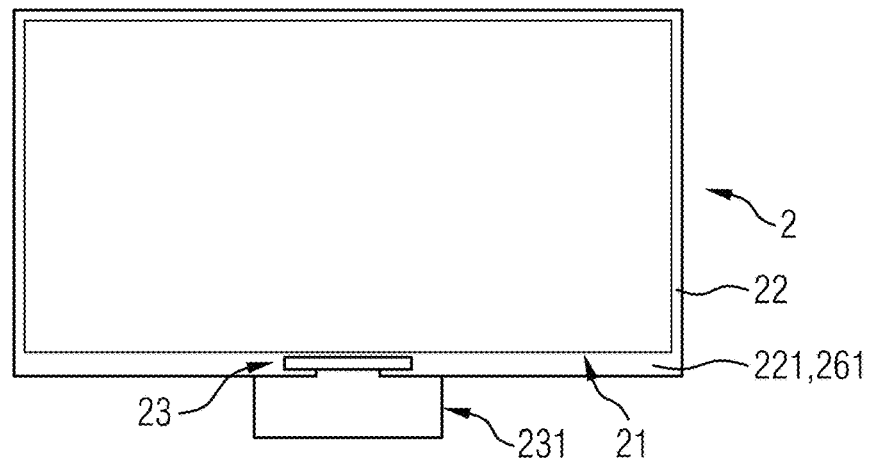
FIG. 1 shows a front view of a display.

The present description illustrates the principles of the present disclosure. It will thus be appreciated that those skilled in the art will be able to devise various arrangements that, although not explicitly described or shown herein, embody the principles of the disclosure.

All examples and conditional language recited herein are intended for educational purposes to aid the reader in understanding the principles of the disclosure and the concepts contributed by the inventor to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams presented herein represent conceptual views of illustrative circuitry embodying the principles of the disclosure.

Identical or similar elements are indicated by the same reference number in different figures and not necessarily explained in depth for all figures.

The standard liquid crystal display panel 2 consists as a typical construction, in a front plane 24, an LC layer 25 and a backplane which is a glass substrate 26 in the embodiment shown here. Typically, there are other layers known to the skilled person that are not mentioned here for simplicity. The glass substrate 26 is larger than front plane 24 and the display driver 23 is placed on it, as shown in FIG. 1 and FIG. 2.

FIG. 1 shows a front view of a display as known in prior art. Through a front glass 1 (not shown here) a display panel 2 is visible. It has a large visible area 21 surrounded by an invisible area 22. The invisible area is made invisible for example by a non-transparent black print on the front glass 1 outer rim. In the figure at the lower side there is shown an enlarged part 221 of the invisible area 21. In this enlarged part 221, which coincides with an area 261 on which electronic elements may be arranged using chip-on-glass technology, a display driver 23 is arranged. The display driver 23 is connected via a flexible printed circuit 231 to other electronic circuitry not shown here. The flexible printed circuit board 231 is shown here in a non-connected state.

Figure 2:
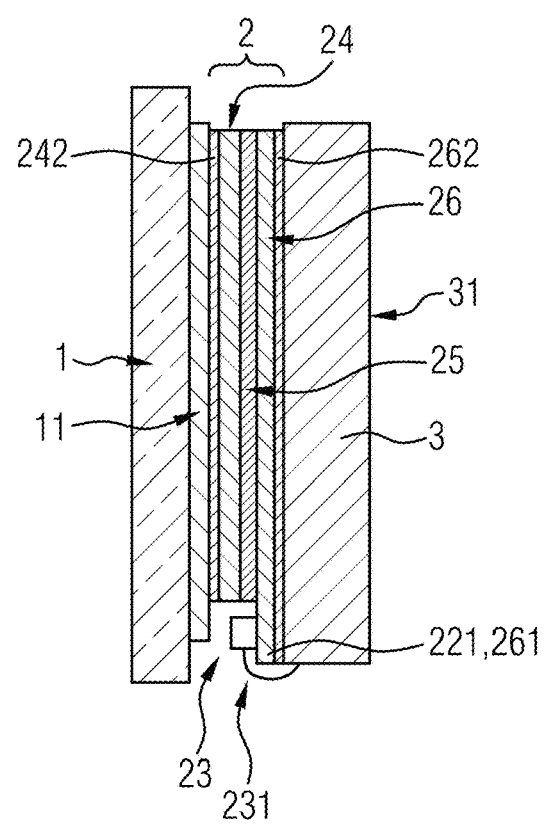
FIG. 2 shows a cut view of the display shown in FIG. 1.

FIG. 2 shows a cut view of the display shown in FIG. 1. On the left side the front glass 1 is visible. The display panel 2 has a front plane 24 on which a front polarizer 242 is arranged and a substrate 26 as backplane on which a back polarizer 262 is arranged. A liquid crystal layer 25 is sandwiched between front plane 24 and substrate 26. The substrate 26 is made of glass in the embodiment shown here. The front plane 24 is bonded to the front glass by an optical bonding layer 11. The optical bonding layer 11 usually consists of cured liquid bonding material, where the liquid bonding material was applied in liquid state, dispensed to completely fill the space between front glass 1 and front plane 24 and then cured, e.g., by heat or by UV light. It may also consist of a bonding tape or film that were applied in solid state during bonding. The substrate 26 is larger than the front plane 24. On the area 261 of the substrate 26, which area at least partly overlaps with the enlarged part 221 of the non-visible area 21, the display driver 23 is arranged, e.g., by a so-called chip-on-glass (COG) process. The display driver 23 is thus arranged close to some parts of the polarizers 242,262 which might be negatively affected if overheated due to heating of the display driver 23. The substrate 26 is connected to a backlight unit 3. The backlight unit 3 contains different elements not shown here, such as, e.g., light sources, drivers for the light sources, electronic circuitry, optical elements to guide and form the light that finally enters and passes the display panel 2. The backlight unit has a backplate 31 that covers it to the outside. The display driver 23 is electrically connected to electronic circuitry, e.g., placed inside the backlight unit 3 via the flexible printed circuit 231 that is shown here in it connected and bent state.

Figure 3:
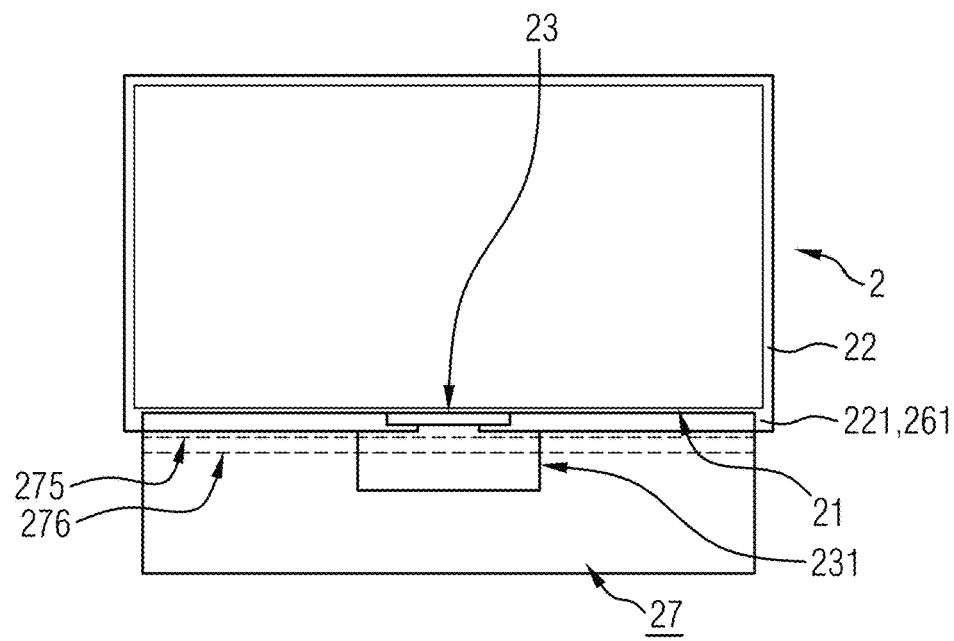
FIG. 3 shows a front view of a display according to the disclosure.

FIG. 3 shows a front view of a display according to the disclosure. As in the previous figures, display panel 2 with visible area 21 and non-visible part 22 are shown, the display driver 23 as well as the flexible printed circuit 231. In addition, a graphite sheet 27 is shown. It is arranged atop the area 261 and covers the display driver 23 as well as the flexible printed circuit 231. Although not visible through the graphite sheet 27, they are depicted here. The graphite sheet 27 as well as the flexible printed circuit 231 are shown in their unbent state which they assumes before assembly. For the graphite sheet 27 a first bending line 275 is shown as dashed line, and a second bending line 276 is shown as dashed line. During assembly the graphite sheet is bent at these bending lines 275,276 by about 90°. The area shown below the second bending line 276 in the figure is to be contacted to the backplate 31. This area is shown rather large which will guarantee a large heat dissipation area as well as a large electromagnetic shielding area. Depending on circumstances, this area might be made smaller. Under certain circumstances the graphite sheet 27 might be made less wide, but still being efficient regarding heat dissipation and/or electromagnetic shielding. There might e.g. be less or no elements arranged at the left or right order that are prone to electromagnetic hazard. In this case a less wide graphite sheet 27 will still provide sufficient electromagnetic shielding.

Figure 4:
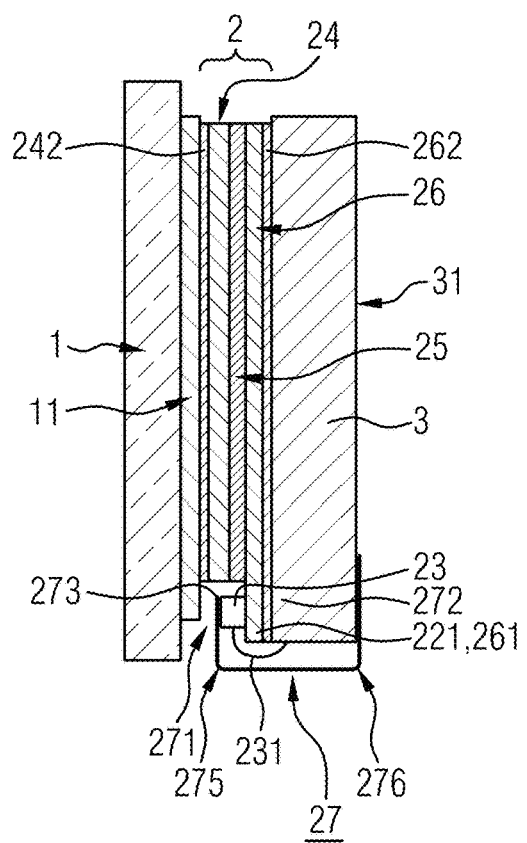
FIG. 4 shows a cut view of the display shown in FIG. 3.

FIG. 4 shows a cut view of the display shown in FIG. 3. Most elements are arranged in the same way as described with regard to FIG. 2 above. In the lower part of the figure the graphite sheet 27 is shown. In a first contact area 271 it is connected directly to the display driver 23. Preferably, a heat conducting glue is used for this connection. This glue is preferably provided on the top surface of the display driver 23 and the graphite sheet 27 is applied to the glue. It is visible that the first contact area 271 of the graphite sheet 27 has an excess end 273 that extends a bit further over the display driver 23. Thus, the electro-magnetic shielding effect of the graphite sheet 27 covers the display driver 23 even better than if there was no excess end 273. The graphite sheet 27 is bent twice about 90°: at the first bending line 275 and at the second bending line 276. The graphite sheet 27 is connected at a second contact area 272 to the outer side of the backplate 31 in a thermally conductive way. The backplate 31 is thus heated at the same side where it also releases heat to outside air. It thus does not add additional heat to the inside of the backlight unit. The graphite sheet 27 not only transports heat away from the display driver 23 to the backplate 31 but also acts as electro-magnetic shield for the flexible printed circuit 231 and other electronic elements arranged in this area of the backlight unit 3.

The display driver 23 is cooled with the help of the graphite sheet 27. Such graphite sheet 27 or graphite foil is an ultra-high thermal conductive material, that meets automotive temperature requirements. It is placed over the entire area 261 and thus covers the display driver 23 as well as other electric or electronic elements arranged in this area 261. The graphite sheet 27 is glued on the top side of the display driver 23 and covers the entire area 261 of the display panel, where electronic or optical components are arranged using a so-called chip-on-glass (COG) technology. The graphite sheet 27 then is bent two times at 90 degrees and then is glued to the backplate 31 of the backlight unit 3 to transfer the heat from the display driver 23 to the metallic backplate 31, after the flexible printed circuit 231 is put in position.

The graphite sheet 27 preferably cover the entire area used for COG, for better heat transfer, wherever the display driver 23 or another electronic component is placed. Due the good electrical conductivity properties, the graphite sheet 27 is also used as EMI (electro-magnetic interference) shielding. A big advantage reached by the inventive concept is the temperature drop of the display driver 23 without using any other expensive cooling solution, or a big mechanical change and compliance with higher customer requirements.

The concept according to the disclosure may also be used for heat dissipation of any integrated circuit (IC) arranged on the chip-on-glass area of the enlarged part 221 of the display panel or arranged on a printed circuit board (PCB) which heats up. No auxiliary cooling or other heatsink attached is required in this case. The graphite sheet 27 is preferably attached over multiple automotive ICs, which may be of different heights, spreading the heat to the metallic parts, e.g., the backplate 31 to which the graphite sheet 27 will be attached, thus reducing the production of the metal parts that are often far too complex, due to geometric shapes of different elements like ICs.

The general idea of placing a graphite sheet for heat dissipation is used on different products in household appliances, mobile phones or TV sets. However, the inventive idea is to use that graphite sheets as a combination of heat dissipation and electro-magnetic interference (EMI) protection on automotive displays bonded using liquid. These displays used in automotive applications need to fulfill very strict requirements, and not only the displays, but the entire bonded assembly. Some automotive applications require a display cluster that may withstand a temperature of 90° Centigrade in the car. That means that the temperature inside the cluster is higher and the displayed image will be altered, due polarizer damage, for example.

The inventive idea to use the graphite foil has two main aspects: The first one is to protect the polarizer from overheating which ultimately would lead to its destruction, by dissipating heat concentrated around the display driver 23 IC. Using liquid bonding technology for bonding front glass 1 and front plane 24 of the display panel 2, makes impossible to use any aluminum heatsink over the display driver 23 IC area or the automotive display. This is because the thickness of the heatsink must not be higher than display front plane. The display, when it is bonded during production, the bonding liquid must be spread in all directions. If the display driver 23 area is blocked because the existence of a bulky heatsink, the bonding liquid will not flow properly and the display panel 2 will not be in the right position and air bubbles will appear in bonding fluid. These disadvantages are avoided by using the inventive concept.

The second main aspect is to fulfill electro-magnetic compatibility (EMC) requirements. Automotive clusters usually have a plastic frame and front glass. Even if the display has a metallic backplate 31, the driver lines and circuits are unprotected from electro-magnetic interference (EMI) point of view, and almost every time require additional protect measures, for example using an EMI tape.

The invention claimed is:

1. An electro-optical display, the electro-optical display comprising:
    a front glass;
    a display panel;
    a back light unit;
    a backplate of the back light unit;
    a display driver arranged on the display panel; and
    a graphite sheet extending from the display driver to the backplate,
    wherein the graphite sheet is connected directly to a surface of the display driver and directly to an outer side of the backplate, and
    wherein the display driver is arranged on a glass substrate of the display panel and
    wherein the graphite sheet wraps around an external edge of the display driver and the glass substrate of the display panel to the backplate of the back light unit and covers at least the whole area of the backplate corresponding to an area at which the display driver is arranged on the glass substrate, and
    wherein the graphite sheet is spaced apart from the glass substrate of the display panel at a distance equal to a height of the display driver.

2. The electro-optical display according to claim 1, wherein the graphite sheet extends beyond the surface of the surface of the display driver to which it is attached.

3. The electro-optical display according to claim 1, wherein the display driver is arranged close to a polarizer of the display panel or of the backlight unit.

4. The electro-optical display according to claim 1, wherein the front glass is optically bonded to the display panel.

5. An automotive vehicle comprising an electro-optical display, the electro-optical display comprising:
    a front glass;
    a display panel;
    a backlight unit;
    a backplate of the back light unit;
    a display driver arranged on the display panel; and
    a graphite sheet extending from the display driver to the backplate, wherein the graphite sheet is connected directly to a
surface of the display driver and directly to an outer
side of the backplate, and
wherein the display driver is arranged on a glass substrate
of the display panel and
wherein the graphite sheet wraps around an external edge
of the display driver and the glass substrate of the
display panel to the backplate of the back light unit and
covers at least the whole area of the backplate corresponding to an area at which the display driver is
arranged on the glass substrate, and
wherein the graphite sheet is spaced apart from the glass
substrate of the display panel at a distance equal to a
height of the display driver.

\* \* \* \* \*